United States Patent [19]

Mizuno et al.

[11] Patent Number: 4,769,418
[45] Date of Patent: Sep. 6, 1988

[54] PROPYLENE POLYMER FILM

[75] Inventors: Hajime Mizuno; Kazuhiro Fujiwara, both of Yokkaichi, Japan

[73] Assignee: Mitsubishi Petrochemical Co., Ltd., Tokyo, Japan

[21] Appl. No.: 26,482

[22] Filed: Mar. 16, 1987

[30] Foreign Application Priority Data

Mar. 17, 1986 [JP] Japan .................. 61-58941

[51] Int. Cl.$^4$ .................. C08F 6/02; C08F 297/02
[52] U.S. Cl. .................. 525/106; 425/500
[58] Field of Search ................. 428/500; 525/106, 240

[56] References Cited

U.S. PATENT DOCUMENTS

| | | | |
|---|---|---|---|
| 2,919,474 | 1/1960 | Cole | 525/106 |
| 3,655,565 | 4/1972 | McDonald | 525/106 |
| 3,742,084 | 6/1973 | Olyphant et al. | 525/106 |
| 3,865,897 | 2/1975 | Falender et al. | 525/106 |
| 3,898,300 | 8/1975 | Hilliard | 525/106 |
| 4,048,129 | 9/1977 | Voigt | 525/106 |
| 4,273,896 | 7/1981 | Martin | 525/106 |
| 4,287,108 | 9/1981 | Grigo et al. | 525/106 |
| 4,292,222 | 9/1981 | Grigo et al. | 525/106 |
| 4,472,556 | 9/1984 | Lipowitz et al. | 525/100 |

FOREIGN PATENT DOCUMENTS

| | | | |
|---|---|---|---|
| 104338 | 8/1980 | Japan | 525/106 |
| 192777 | 10/1985 | Japan | 525/106 |
| 735613 | 5/1980 | U.S.S.R. | 525/106 |

*Primary Examiner*—Edith Buffalow
*Attorney, Agent, or Firm*—Oblon, Fisher, Spivak, McClelland & Maier

[57] ABSTRACT

A propylene polymer film composed of a composition comprising 100 parts by weight of a crystalline propylene polymer and 0.01 to 3 parts by weight of a non-meltable crosslinked silicone resin powder having a mean particle diameter of 0.5 to 7 microns. The film is especially suitable for packaging applications because of its good transparency, antiblocking property, bag openability, slipperiness, appearance and heat-sealability.

13 Claims, No Drawings

PROPYLENE POLYMER FILM

FIELD OF THE INVENTION

This invention relates to a propylene polymer film containing a special crosslinked silicone resin powder.

This film has especially good transparency and exhibits a marked improvement in antiblocking property, bag openability, slipperiness and appearance.

BACKGROUND OF THE INVENTION

Propylene polymer films are universally used as various packaging material.

However, propylene polymer films of this type have tackiness and tend to undergo blocking. This problem impairs working property in the molding and subsequent processing of the films. In addition, when these films are used, for example, in packaging, troubles such as poor bag openability, etc. tend to occur.

In an attempt to remove these defects, it was proposed, for example, to incorporate additives, such as active silicic acid anhydride (Japanese Patent Publication No. 16908/64), kaolinite (Japanese Patent Publication No. 24523/68), and finely pulverized zeolite powder (Japanese Patent Publication No. 16134/77), in a propylene polymer.

These prior methods exhibit some effect in regard to improve antiblocking property, but cannot fully meet other requirements which have become strict in recent years, as described below.

Firstly, the transparency of films has been regarded as important to secure aesthetic beauty. The antiblocking property of the films can be increased by increasing the amount of the antiblocking agent added. But with increasing amount of the antiblocking agent, its dispersion becomes poor and reduces the transparency of the resulting films.

Secondly, since the present-day film-forming apparatus is adapted to operate at high speeds, the windability of film during film formation is a very important factor. The slipperiness of films during wind-up is poor, and the films cannot be well wound up. Thus, many unacceptable film products result. The film slipperiness has not yet been improved satisfactorily by adding various lubricants.

Thirdly, with regard to the film slipperiness after film formation, for example the bag openability of an article such as a bag formed from the film, etc., an attempt to improve it has previously been made by adding a higher fatty acid amide, etc. as a lubricant so as to bleed out the lubricant onto the film surface. However, if the lubricant is added in a large amount in order to increase the extent of improvement of the slipperiness, whitening occurs to impair the transparency of the film.

On the other hand, catalysts for producing the propylene polymers have been much improved. For example, as a result of increasing productivity by increasing the polymer concentration in a polymerization vessel, and of preventing troubles such as the adhesion of polymer in the polymerization vessel, the poor withdrawal of polymer from the polymerization vessel, etc., it has become possible to obtain polymers in the form of true spherical particles having good powder properties (see, for example, Japanese Laid-Open Patent Application Nos. 34478/72, 40293/79, 180612/82, and 811/81).

Polymer powders in the form of true spherical particles obtained as a result of such improvements in the polymerization process have smooth surfaces. Hence, when such polymer powders are mixed with a conventional inorganic antiblocking agent, the antiblocking agent is dispersed badly in the polymer powders, and the transparency of the resulting film is reduced. Furthermore, many fish eyes occur in the film to reduce the appearance of the film markedly. In an attempt to improve the dispersion of the antiblocking agent such as silicon dioxide, it was proposed, for example, to use a magnesium or aluminum salt of a fatty acid in combination with the antiblocking agent (Japanese Laid-Open Patent Application No. 225142/83), or to use an inorganic fine powder having a layered structure in combination with the antiblocking agent (Japanese Laid-Open Patent Application No. 18747/82). According to these methods, however, the appearance of the film has not been improved satisfactorily.

SUMMARY OF THE INVENTION

An object of this invention is to solve the aforesaid problems of conventional propylene polymer films.

Another object of this invention is to provide a propylene polymer film having marked improved transparency, antiblocking property, slipperiness, bag openability and appearance.

According to this invention, the above objects are achieved by a propylene polymer film composed of a composition comprising 100 parts by weight of a crystalline propylene polymer and 0.01 to 3 parts by weight of a non-meltable crosslinked silicone resin powder having a mean particle diameter of 0.5 to 7 microns.

DETAILED DESCRIPTION OF THE INVENTION

The crystalline propylene polymer used in this invention is a homopolymer of propylene or a random, block or graft copolymer of a major proportion of propylene with a minor proportion of another $\alpha$-olefin having up to 20 carbon atoms (e.g., ethylene, butene, hexene, 4-methylpentene, octene, etc.), an unsaturated carboxylic acid or its derivative (e.g., acrylic acid, maleic anhydride, etc.), an aromatic vinyl monomer (e.g., styrene, etc.), etc. Preferably, the crystalline propylene polymer has an isotactic index (which is hereinafter referred to as "II") of at least 40, more preferably at least 60, particularly preferably at least 80. The melt flow rate (which is hereinafter referred to as "MFR") of the crystalline propylene polymer may be one at which it can be molded. Usually, it is 0.1 to 200 g/10 min., preferably 1 to 50 g/10 min., particularly preferably 1 to 30 g/10 min. Propylene homopolymer, propylene/ethylene random copolymer and propylene/ethylene/butene random copolymer each having an ethylene content of 0 to 8% by weight and a butene content of 0 to 25% by weight are preferred.

In particular, propylene/$\alpha$-olefin copolymer resins (propylene/ethylene random copolymer and propylene/ethylene/butene-1 random copolymer being preferred) having a fusion peak temperature, determined by the DSC method, of up to 145° C. are preferred for formation of cast films. These copolymer resins are preferred in that film slipperiness after high-temperature aging during the production of multilayer films is greatly improved and the resulting film have good transparency and heat-sealability.

At least one propylene/$\alpha$-olefin copolymer resin selected from the group consisting of propylene/ethylene random copolymer resins having an ethylene content of 3 to 8% by weight and propylene/ethylene/butene-1 random copolymer resins having an ethylene content of 0.5 to 5% by weight and a butene-1 content of 3 to 25% by weight is preferred for formation of biaxially oriented multilayer films. Such a copolymer resin is preferred in that it can give biaxially oriented multilayer films having good slipperiness at temperatures over a wide range, markedly improved adaptability to packaging apparatus, and good transparency and low-temperature heat sealability.

The crystalline propylene polymer used in this invention produces a great effect and is preferred when it is in the form of a powder having a mean particle diameter of 50 to 3,000 microns and a true spherical degree f, defined by the following equation (1), of at least 0.8, particularly at least 0.85. The powder, used herein, means the form of the polymer as obtained, and not a powder obtained by pelletizing the resulting polymer.

$$\text{True spherical degree (f)} = \sqrt{A/(\pi/4)}/\text{Dmax} \quad (1)$$

where A is the cross-sectional area (mm$^2$) of the polymer powder, and Dmax is the maximum diameter (mm) of the cross section of the polymer powder.

A and Dmax can be determined by adding a epoxy resin to the polymer powder solidifying the mixture, cutting the solidified mixture by a microtome, and then analyzing the cross-sectional surface of the polymer powder by an image analyzer.

The true spherical degree given by the equation (1) is in the range of 0 to 1. When the particle is a true sphere, its true spherical degree is 1.

The polymer powder obtained in the polyolefin manufacturing process is inherent to the process. It is obtained by polymerizing or copolymerizing an olefin with a Ziegler-type catalyst according to a polymerization process such as the slurry method, the solventless liquid-phase method or the gas-phase method. It is said that the shape of the powder generally reflects the shape of the catalyst particles used in the polymerization.

Examples of catalysts for producing a spherical olefin polymer powder having a true spherical degree f (defined by the aforesaid equation (1)) of at least 0.8 include catalysts obtained by reducing TiCl$_4$ in the homogeneous state with an organic aluminum compounds to obtain a spherical TiCl$_3$ catalyst component as shown, for example, in Japanese Laid-Open Patent Application Nos. 34478/72 and 59094/74; catalysts composed of a spherical Mg compound and Ti deposited thereon as shown, for example, in Japanese Laid-Open Patent Application Nos. 40239/79, 811/81, 5310/83, 41985/79, 135102/80 and 67311/81; a catalyst composed of a carrier such as spherical silica, etc. and a Ti component or an Mg/Ti component deposited thereon as shown in, for example, Japanese Laid-Open Patent Publication No. 92008/82, etc.

The non-meltable crosslinked silicone resin powder used in this invention is a silicone resin powder having a three-dimensional network structure by siloxane linkages. An organic group is bonded to silicon. Examples of the organic group include aliphatic hydrocarbon groups such as a methyl group, an ethyl group, etc., aromatic hydrocarbon groups such as a phenyl group, etc., unsaturated hydrocarbon groups having a vinyl group, etc. The methyl group is preferred. Various modified silicon resin powders may also be used if they do not impair the effects of the present invention.

Generally, the silicone resin is available as a silicone varnish obtained by dissolving an initial-stage condensate in a suitable solvent. The silicone resin used in this invention is a solvent-free powder having a mean particle diameter of 0.5 to 7 microns. It is a substantially insoluble and infusible substance obtained as a result of heat curing.

The silicone resin powder used in this invention preferably has such a shape that its true spherical degree f defined by the aforesaid equation (1) is at least 0.8. Particularly preferably, the silicone resin powder has a true spherical degree of at least 0.85 and a mean particle diameter of 1 to 5 microns. The true spherical degree particularly affects the slipperiness of the final film product.

The true spherical degree of the silicone resin powder is determined by the following method. The powder is placed on an electron microscope grid with a collodion supporting film applied thereto, and observed and photographed at a suitable magnification. The resulting photograph is processed by an image analyzer, and the true spherical degree f is calculated in accordance with the aforesaid equation (1).

If the mean particle diameter of the silicone resin powder exceeds 7 microns, the transparency of the film is reduced. If it is less than 0.5 micron, the effect of the silicone resin powder to improve film slipperiness and antiblocking property during film-formation and wind-up is reduced.

The special silicone resin powder used in this invention may be properly selected from commercial grades of this resin.

In the present invention, 100 parts of the crystalline propylene polymer is mixed with 0.01 to 3 parts by weight, preferably 0.01 to 1 part by weight, more preferably 0.01 to 0.5 part by weight, particularly preferably 0.02 to 0.3 part by weight, of the silicone resin powder. If the amount of the silicone resin powder added is less than 0.01 part by weight, the final film lacks antiblocking property and slipperiness during film-formation and wind-up although it has good transparency. If it is larger than 3 parts by weight, it undesirably has reduced transparency although it has good antiblocking property and slipperiness.

Conventional additives for polyolefins, such as stabilizers, processing aids, antistatic agents, etc. or olefinic rubbers, etc. may be added to the above mixture in such an amount that the properties of film are not impaired. It is preferred, for the purpose of improving the antiblocking property and slipperiness of films, to add an inorganic compound such as silica, talc, etc., an aliphatic amide having 18 to 22 carbon atoms (e.g., a saturated fatty acid amide such as erucamide, stearamide, behenamide, etc.), etc. in an amount of up to 0.20 part by weight per 100 parts by weight of the propylene polymer.

If 0.05 to 0.6 part by weight, per 100 parts by weight of the propylene polymer, of a sorbitol derivative such as 1,3,2,4-dibenzylidene-D-sorbitol, 1,3,2,4-di-p-methyl-dibenzylidene-D-sorbitol, 1,3,2,4-di-p-ethyl-dibenzylidene-D-sorbitol, etc. is incorporated as a nucleating agent, the molten resin can be crystallized within a short period of time at the time of heat sealing. Hence, the apparatus adaptability of the film after completion of packaging is further improved, and the transparency of the film also increases.

These components may be mixed by a known powder mixer, for example, a V-type blender, a screw-type blender, a dry blender, a ribbon blender, a Henschel mixer, etc. and kneaded by a roll, an extruder, etc. thereby to pelletize the mixtures. Needless to say, the silicone resin never gets melted during the mixing operation.

Usually, prior to film formation, the required components are mixed by a general kneader to form a composition. The silicone resin powder may be added at a time in the desired amount. Alternatively, it is possible to mix it in an amount larger than desired amount to form a master batch which may be diluted with the propylene polymer at the time of film formation.

The film of this invention may be formed by conventional methods, such as an inflation method, a T-die method, a monoaxial orienting method, a biaxial orienting method, etc.

The dry laminating method used to form a cast multilayer film generally comprises coating an adhesive on a substrate film using a roll such as a gravure roll, etc., drying the solvent by passing the coated film through a drying oven, and thereafter bonding a cast film to the substrate film on a hot metallic roll. The adhesive used at this time is, for example, of the vinyl, acrylic, polyamide, epoxy or urethane type, etc.

The substrate film may be a film of the propylene polymer described above, a biaxially oriented film obtained from it, a nylon film, a polyester film, etc.

The biaxially oriented multilayer film is preferably formed, for example, by melt co-extruding a composition composed of the components constituting the film of this invention onto one or both surfaces of a propylene polymer resin as a substrate layer to form a sheet and biaxially orienting the resulting sheet because this composition can be laminated easily and uniformly in a thin layer. However, there can also be used a method comprising melt-extruding the aforesaid composition on a substrate sheet which is casted or has been monoaxially oriented and orienting the laminated sheet.

In the case of biaxial orienting, longitudinal orienting is carried out by utilizing the difference in the peripheral speeds of rolls. The longitudinal orienting is carried out at 90° to 140° C., preferably 105° to 135° C., to 3 to 8 times, preferably 4 to 6 times, the original length. Subsequently, the sheet is oriented in the transverse direction in a tenter oven to 3 to 12 times, preferably 6 to 11 times. To prevent thermal shrinkage at the time of heat sealing, the film is desirably heat-set at 120° to 170° C. after the transverse orienting.

The resulting film may be subjected to a corona discharge treatment to increase its printability or promote bleeding of the antistatic agent therein.

The thickness of the film may be selected within a conventional range according to the purpose for which the final film product is used.

The present invention provides a propylene polymer film having good transparency, antiblocking property, slipperiness, bag openability and heat sealability. From a propylene polymer having a true spherical degree of at least 0.8 from which a film having additives well dispersed therein cannot be obtained by the prior art, the present invention can give a film having good appearance and heat sealability, and being free from fish eyes.

The following examples given under the headlines "Working Examples I", "Working Examples II" and "Working Examples III" illustrate this invention more specifically. However, this invention should not be construed as in any way being limited thereto.

WORKING EXAMPLES I

The various properties in the following examples were measured by the following methods.

(a) True spherical degree: The propylene polymer powder and the silicone resin powder were respectively observed and photographed by the method described hereinbefore, and their true spherical degree f was calculated in accordance with the aforesaid equation (1).

(b) Transparency of the film: The haze of a single film was measured substantially in accordance with ASTM-D1003.

(c) Antiblocking property: Two films were laid one on top of the other so that the area of contact between the two was 10 cm$^2$, and then interposed between two glass plates. The assembly was left to stand for 24 hours in an atmosphere at 40° C. under a load of 50 g/cm$^2$. Then, the films were separated apart by a Schopper-type tester, and the maximum load at this time was measured.

(d) Slipperiness of the film: The coefficient of dynamic friction and the coefficient of static friction of the film were measured by a surface property tester (made by Shintoh Kagaku Co., Ltd.) substantially in accordance with ASTM-D1894.

(e) Bag openability of the film: Immediately after film formation, it was evaluated on the following standards.

Evaluation Point

1: easily opened when the sample was held by a finger tip
2: some resistance was felt at the time of opening
3: considerable resistance was felt at the time of opening
4: the sample could be opened, but with much difficulty.

(f) Appearance of the film: Fine spots on the film surface were observed with the naked eyes, and evaluated on the following standards.

Evaluation Point

1: No spot was observed
2: Some spots existed but no problem in practical use
3: Many spots were observed and raised a problem in practical use
4: Spots were considerably many, and the film could not be offered for practical use.

EXAMPLE 1

One hundred parts by weight of crystalline propylene homopolymer having an MFR of 9.8 g/10 min. and a true spherical degree of 0.920, 0.8 part by weight of a non-meltable crosslinked silicone resin powder (made by Toshiba Silicone Co., Ltd.) having a mean particle diameter of 2 microns and a true spherical degree of 0.930, 0.15 part by weight of 2,6-di-t-butyl-p-cresol as an antioxidant and 0.05 part by weight of calcium stearate as a hydrochloric acid capturing agent were mixed for 2 minutes by a supermixer, and melt-kneaded at 250° C. by a single-screw extruder having a screw diameter of 30 mm to form pellets. The pellets were extruded by an extruder having a screw diameter of 35 mm and fitted with a T-die at 250° C. to obtain a cast film having a thickness of 25 microns. The transparency, antiblocking resistance, slipperiness immediately after film formation and appearance of the resulting film were evaluated.

EXAMPLE 2

Example 1 was repeated except that the amount of the silicone resin powder added was changed to 0.3 part by weight.

EXAMPLE 3

Example 1 was repeated except that propylene/ethylene random copolymer having an ethylene content of 4.5% by weight, an MFR of 6.5 g/10 min. and a true spherical degree of 0.901 was used instead of the propylene homopolymer, and the amount of the silicone resin powder added was changed to 0.5 part by weight.

EXAMPLE 4

Example 3 was repeated except that a non-meltable crosslinked silicone resin powder having a true spherical degree of 0.745 and a mean particle diameter of 4 microns was used instead of the silicone resin powder used in Example 3.

COMPARATIVE EXAMPLE 1

Example 1 was repeated except that a silicone dioxide powder having a mean particle diameter of 3 microns was used instead of the silicone resin powder.

COMPARATIVE EXAMPLE 2

Example 3 was repeated except that a silicone dioxide powder having a mean particle diameter of 3 microns was used instead of the silicone resin powder.

The results of the foregoing examples and comparative examples are shown in Table 1.

In all of the following tables, Ex. stands for Example, and CEx., Comparative Example.

EXAMPLE 5

One hundred parts by weight of propylene/ethylene/butene random copolymer (ethylene content 2.0% by weight, butene content 7.3% by weight) having an MFR of 8.0 g/10 min. and a true spherical degree of 0.902, 0.3 part by weight of a non-meltable crosslinked silicone resin powder having a true spherical degree of 0.930 and a mean particle diameter of 2 microns, 0.10 part by weight of 2,6-di-t-butyl-p-cresol as an antioxidant, 0.05 part by weight of calcium stearate as a hydrochloric acid capturing agent and 0.10 part by weight of erucamide as a lubricant were mixed by a supermixer for 2 minutes, and then melt-kneaded by a single-screw extruder having a screw diameter of 30 mm at 230° C. to form pellets. Using the resulting pellets, an inflation film having a thickness of b 30 microns was obtained. The transparency, bag openability and appearance of the resulting film were evaluated.

COMPARATIVE EXAMPLE 3

Example 5 was repeated except that 0.6 part by weight of a silicon dioxide powder having a mean particle diameter of 3 microns was added instead of the silicone resin powder.

The results of the foregoing example and comparative example are shown in Table 2.

TABLE 2

| | Propylene Polymer | | Main Additive | | | Film Properties | | |
| --- | --- | --- | --- | --- | --- | --- | --- | --- |
| | Type | True spherical degree | Type | True spherical degree | Amount added (part by weight) | Haze (%) | Bag openability (evaluation point) | Appearance (evaluation point) |
| Ex. 5 | Ethylene/butene-containing random copolymer | 0.902 | Silicone resin (2μ) | 0.989 | 0.3 | 4.7 | 2 | 1 |
| CEx. 3 | Ethylene/butene-containing random copolymer | " | Silicone dioxide (3μ) | — | 0.6 | 5.8 | 3 | 4 |

EXAMPLE 6

One hundred parts by weight of crystalline propylene homopolymer having an MFR of 1.9 g/10 min. and a true spherical degree of 0.920, 0.05 part by weight of a nonmeltable crosslinked silicone resin powder having a true spherical degree of 0.930 and a mean particle diameter of 2 micorns, 1.10 part by weight of 2,6-di-t-butyl-p-cresol as an antioxidant, 0.05 part by weight of calcium stearate as a hydrochloric acid capturing agent, and 0.6 part by weight of stearyl monoglyceride as an antistatic agent were mixed by a supermixer for 3 minutes and then pelletized.

The pellets were formed into a sheet-like film by an extruder, and then oriented to 5 times in the longitudinal direction and then to 10 times in the transverse direction

TABLE 1

| | Propylene Polymer | | Main Additive | | | Film Properties | | | |
| --- | --- | --- | --- | --- | --- | --- | --- | --- | --- |
| | Type | True spherical degree | Type | True spherical degree | Amount added (part by weight) | Haze (%) | Antiblocking property (g/10 cm$^2$) | (*) Slipperiness | Appearance (evaluation point) |
| EX. 1 | Homopolymer | 0.920 | Silicone resin (2μ) | 0.989 | 0.8 | 9.5 | 80 | 0.55/0.43 | 1 |
| EX. 2 | " | " | Silicone resin (2μ) | " | 0.3 | 4.8 | 130 | 0.57/0.46 | 1 |
| EX. 3 | Ethylene-containing random copolymer | 0.901 | Silicone resin (2μ) | " | 0.5 | 6.2 | 200 | 0.62/0.48 | 1 |
| Ex. 4 | Ethylene-containing random copolymer | " | Silicone resin (4μ) | 0.745 | 0.5 | 6.6 | 230 | 0.81/0.73 | 1 |
| CEx. 1 | Homopolymer | 0.920 | Silicon dioxide (3μ) | — | 0.8 | 7.2 | 130 | 1.21/1.15 | 4 |
| CEx. 2 | Ethylene-containing random copolymer | 0.901 | Silicon dioxide (3μ) | — | 0.5 | 5.3 | 280 | 1.35/1.20 | 3.5 |

(*): Static friction/dynamic friction (coefficients)

to obtain a oriented film having a thickness of 30 microns. The transparency, antiblocking property, slipperiness immediately after film formation and appearance of the resulting oriented film were evaluated.

COMPARATIVE EXAMPLES 4 AND 5

Example 6 was repeated except that a silicone dioxide powder having a mean particle diameter of 1 micron was used in an amount of 0.15 part by weight or 0.05 part by weight instead of the silicone resin powder.

The result of the foregoing example and comparative examples are shown in Table 3.

having a screw diameter of 35 mm and fitted with a T-die at 230° C. to prepare a cast single layer film having a thickness of 30 microns. One surface of the film was subjected to corona discharge treatment so that its wetting tension became 40 dynes/cm. The film was aged for 2 days in an atmosphere kept at 40° C. A biaxially oriented polypropylene film having a thickness of 25 microns was used as a substrate film. One surface of the substrate film was coated with a urethane-type two-part reactive adhesive, and that surface of the single layer film which had been treated with a corona discharge was dry-laminated onto the coated surface of the

TABLE 3

| | Propylene Polymer | | Main Additive | | | Film Properties | | | |
|---|---|---|---|---|---|---|---|---|---|
| | Type | True spherical degree | Type | True spherical degree | Amount added (part by weight) | Haze (%) | Antiblocking property (g/10 cm²) | (*) Slipperiness | Appearance (evaluation point) |
| EX. 6 | Homopolymer | 0.920 | Silicone resin (2μ) | 0.989 | 0.05 | 1.8 | 440 | 0.45/0.32 | 1 |
| CEx. 4 | " | " | Silicon dioxide (1μ) | — | 0.15 | 2.4 | 680 | 0.87/0.76 | 4 |
| CEx. 5 | " | " | Silicon dioxide (1μ) | — | 0.05 | 1.6 | 1020 | 0.95/0.84 | 3 |

(*): Static friction/dynamic friction (coefficients)

WORKING EXAMPLES II

The various properties were evaluated by the following methods.

(a) True spherical degree: same as in Working Examples I.

(b) Transparency: Four films were superimposed, and the transparency of the multilayer sheet was measured substantially in accordance with ASTM-D1003.

(c) Slipperiness: Measured substantially in accordance with the method of measuring a coefficient of static friction in ASTM-D1894.

(d) Fusion peak by the DSC method: By using DSC substrate film. The two-layer film was aged for 3 days in an atmosphere kept at 45° C.

The slipperiness of the single-layer film after aging at 40° C. for 2 days but before dry lamination and the slipperiness of that surface of the two-layer film (aged at 40° C. for 3 days after dry lamination), which had not been subjected to corona discharge treatment were measured.

The transparency of the single-layer film after aging at 40° C. for 2 days but before dry lamination was measured.

The results of the foregoing examples and comparative examples are shown in Table 4.

TABLE 4

| | Additives | | | | | | | Slipperiness | | Transparency (%) |
|---|---|---|---|---|---|---|---|---|---|---|
| | Silicone Resin Powder | | | Synthetic Silica | | Fatty Acid Amide | | | | |
| | Mean particle diameter (μ) | True spherical degree | Amount (part by weight) (*) | Mean particle diameter (μ) | Amount (part by weight) (*) | Type | Amount (part by weight) (*) | before dry-lamination | after dry-lamination | before dry-lamination |
| EX. 7 | 2 | 0.989 | 0.20 | — | — | Behenamide | 0.10 | 0.22 | 0.25 | 18.3 |
| EX. 8 | 2 | 0.989 | 0.12 | — | — | Stearamide | 0.10 | 0.19 | 0.20 | 12.5 |
| Ex. 9 | 4 | 0.745 | 0.12 | — | — | Stearamide | 0.10 | 0.23 | 0.30 | 13.3 |
| CEx. 6 | — | — | — | 3 | 0.30 | Behenamide | 0.05 | 0.38 | 0.47 | 15.7 |
| CEx. 7 | — | — | — | 3 | 0.15 | Oleamide | 0.08 | 0.27 | 0.83 | 10.8 |

(*): per 100 parts by weight of the propylene copolymer made by Perkin-Elmer Co., Ltd., 5.0 mg of the sample was taken, and maintained at 190° C. for 3 minutes. Then, the sample was crystallized by decreasing the temperature to 50° C. at a rate of 10° C./min. It was then fused at a temperature elevating rate of 10° C./min., and the fusion peak temperature at this time was determined.

EXAMPLES 7 TO 9 AND COMPARATIVE EXAMPLES 6 AND 7

One hundred parts by weight of propylene/ethylene random copolymer (ethylene content 4.5% by weight; fusion peak temperature 137.5° C.; MFR 6.0 g/10 min.), 0.15 part by weight of 2,6-di-t-butyl-p-cresol as an antioxidant, 0.05 part by weight of calcium stearate as a hydrochloric acid capturing agent and various additives indicated in Table 4 were mixed for 3 minutes and pelletized. The pellets were extruded by an extruder

EXAMPLES 10 AND 11 AND COMPARATIVE EXAMPLE 8

One hundred parts by weight of propylene/ethylene/butene-1 random copolymer (ethylene content 2.0% by weight; butene-1 content 12.5% by weight; fusion peak temperature 131.0° C.; MFR 5.5 g/10 min.) were mixed with the additives indicated in Table 5 for 3 minutes and pelletized. A cast film was prepared in the same manner as in Example 7 from the resulting pellets.

The resulting film was dry-laminated onto a substrate film wnhich was a biaxially oriented nylon film (15 microns) or a biaxially oriented polyester film (12 microns) in the same manner as in Example 7. The resulting film was evaluated as in Example 7.

The results of the foregoing examples and comparative example are shown in Table 5.

TABLE 5

| | Substrate film (**) | Additives Main Additive Type | Mean particle diameter (μ) | True spherical degree | Amount (part by weight) (*) | Fatty Acid Amide Type | Amount (part by weight) (*) | Slipperiness before dry-lamination | Slipperiness after dry-lamination | Transparency (%) before dry-lamination |
|---|---|---|---|---|---|---|---|---|---|---|
| Ex. 10 | Nylon | Silicone resin powder | 2 | 0.989 | 0.12 | Stearamide | 0.05 | 0.25 | 0.28 | 12.2 |
| Ex. 11 | Polyester | Silicone resin powder | 2 | 0.989 | 0.10 | Behanamide | 0.08 | 0.21 | 0.22 | 10.5 |
| CEx. 8 | Polyester | Synthetic silica | 3 | — | 0.25 | Erucamide | 0.08 | 0.17 | 0.60 | 14.7 |

(*): per 100 parts by weight of the propylene copolymer
(**): biaxially oriented film

WORKING EXAMPLE III

The various properties were evaluated by the following methods.

(a) True spherical degree: same as in Working Examples I (b) Transparency: same as in Working Examples II.

(c) Slipperiness: Measured substantially in accordance with the method of measuring a coefficient of static friction in ASTM-D1894. Slipperiness between films at high temperatures was measured by providing a heater in a slip tester so that the films can be kept at a predetermined temperature. Slipperiness between a film and a metal was measured between the film and an iron plate coated with Teflon.

(d) Heat sealability: A sample having a width of 20 mm was cut off from a sealed film specimen obtained by using a heat seal bar (5 mm × 200 mm) under heat-sealing conditions involving a heat sealing pressure of 1 kg/cm$^2$ and a heat sealing time of 0.5 second at each of the preset temperatures. The sample was peeled part by using a Schopper-type tester at a pulling speed of 500 mm/min., and the maximum load was read.

(e) Film falling property: The film sample was set in a packaging apparatus, and then cut by a cutter. At this time, the degree of vertical falling of the film without contact with the packaging apparatus was observed visually, and evaluated.

(f) Slipperiness with respect to metal in a packaging apparatus: After packaging, the heat-sealed portion of the film was observed, and the degree of scar was evaluated.

(g) Appearance of package: After packaging, the package was compared with a commercial tobacco packed with cellophane.

EXAMPLES 12 TO 14

As a substrate layer, a composition composed of 100 parts by weight of polypropylene having an MFR of 2.3 g/10 min. and an II of 98.5%, 0.6 part by weight of glyceryl monostearate, 0.1 part by weight of N,N-bis(2-hydroxyethyl)alkylamine and 0.3 part by weight of a fatty acid ester of polyoxyethylene alkylamine was used. A composition composed of 100 parts by weight of ethylene/propylene/butene-1 random copolymer having an ethylene content of 1.7% by weight, a butene-1 content of 12.5% and an MFR of 6.0 g/10 min. and each of the amounts indicated in Table 6 of a non-meltable crosslinked silicone resin powder having a mean particle diameter of 2 microns and a true spherical degree of 0.989 was used as a surface layer.

Each of these compositions was further mixed wih 0.10 part by weight of 2,6-di-t-butyl-p-cresol as an antioxidant and 0.05 part by weight of calcium stearate as a hydrochloric acid capturing agent, and pelletized. Using these pelletized compositions, a multilayer biaxially oriented polypropylene film was obtained by lamination and successive biaxial orienting under the following conditions.

The substrate layer composition (comprising polypropylene) and the surface layer composition were coextruded at 250° C. by a three-layer die from an extruder having a screw diameter of 115 mm for the former and an extruder having a screw diameter of 35 mm for the latter to provide a three-layer structure composed of the surface layer composition/substrate layer composition/surface layer composition. The resulting three-layer sheet was then oriented to 5 times in the longitudinal direction at 115° C. by utilizing the difference in peripheral speed between rolls, and then oriented to 10 times in the transverse direction in a tenter oven at 168° C. The oriented film was heat-set at 155° C., and then its one surface was treated with a corona discharge to obtain a multilayer biaxially oriented film having a thickness of 0.5 micron/22 microns/0.5 micron.

The transparency, slipperiness and heat-sealability of the film obtained in each run were evaluated.

COMPARATIVE EXAMPLES 9 AND 10

The same procedure as in Examples 12 to 14 was repeated except that in the formation of the surface-layer composition, silica (Syloid 244, a product of Fuji-Davison Co., Ltd.) was added in the amount indicated in Table 6 to 100 parts of the same ethylene/propylene/butene-1 random copolymer as in Examples 12 to 14 instead of the silicone resin powder.

The results of the foregoing examples and comparative examples are shown in Table 6.

TABLE 6

| | Additives Type | Amount (part by weight) | Transparency (%) | Slipperiness on film (23° C.) | Slipperiness on film (80° C.) | Slipperiness on metal (80° C.) | Heat-sealability (g/2 cm) 115° C. | Heat-sealability (g/2 cm) 120° C. | Heat-sealability (g/2 cm) 125° C. |
|---|---|---|---|---|---|---|---|---|---|
| Ex. 12 | Silicone resin powder | 0.05 | 3.8 | 0.20 | 0.69 | 0.57 | 0 | 250 | 390 |
| Ex. 13 | Silicone | 0.08 | 4.4 | 0.18 | 0.65 | 0.55 | 0 | 230 | 370 |

TABLE 6-continued

| | Additives | | Transparency (%) | Slipperiness | | | Heat-sealability (g/2 cm) | | |
|---|---|---|---|---|---|---|---|---|---|
| | Type | Amount (part by weight) | | on film (23° C.) | on film (80° C.) | on metal (80° C.) | 115° C. | 120° C. | 125° C. |
| Ex. 14 | resin powder Silicone resin powder | 0.15 | 5.3 | 0.18 | 0.62 | 0.51 | 0 | 230 | 380 |
| CEx. 9 | Silica | 0.15 | 3.5 | 0.38 | 1.87 | 1.41 | 0 | 230 | 380 |
| CEx. 10 | Silica | 0.30 | 6.5 | 0.32 | 1.42 | 1.27 | 0 | 210 | 350 |

EXAMPLE 15

As a substrate layer, a composition composed of 100 parts by weight of polypropylene having an MFR of 1.9 g/10 min. and an II of 99%, 0.5 part by weight of glyceryl monostearate, 0.1 part by weight of N,N'-bis(1-hydroxyethyl)alkylamine, 0.4 part by weight of a fatty acid ester of polyoxyethylene alkylamine, 0.04 part by weight of erucamide and 0.03 part by weight of stearamide was used. Furthermore, as a surface layer, 80 parts by weight of ethylene/propylene/butene-1 random copolymer having an ethylene content of 1.7% by weight, a butene-1-content of 12.5% by weight and an MFR of 4.0 g/10 min., 20 parts by weight of ethylene/butene-1 random copolymer having an ethylene content of 1.0% by weight and an MFR of 12.0 g/10 min., 0.10 part by weight of a non-meltable crosslinked silicone resin powder having a mean particle diameter of 2 microns and a true spherical degree of 0.898, 0.10 part by weight of 2,6-di-tert-butyl-p-cresol as an antioxidant, 0.05 part by weight of calcium stearate as a hydrochloric acid capturing agent, and 0.30 parts by weight of 1,3,2,4-di-p-ethyl-dibenzylidene-D-sorbitol as a nucleating agent were mixed, and pelletized. These compositions were molded as in Example 12 to form a multilayer biaxially oriented film having a thickness of 0.5 micron/24 microns/0.5 micron. Using the resulting film, cigarettes (tradename "MILD SEVEN") were packed by using a high-speed automatic packaging apparatus (W-322 made by Tokyo Automatic Machine Co.).

EXAMPLE 16

Example 15 was repeated except that the amount of the non-meltable crosslinked silicone resin powder used in the surface layer in Example 15 was changed to 0.15 part by weight, and 1,3,2,4-di-p-ethyl-dibenzylidene-D-sorbitol used as the nucleating agent was not added.

COMPARATIVE EXAMPLE 11

Example 15 was repeated except that 0.20 part by weight of silica was added instead of the non-meltable crosslinked silicone resin powder used in the surface layer in Example 15.

COMPARATIVE EXAMPLE 12

Example 16 was repeated except that in the substrate layer used in Example 16, propylene/ethylene random copolymer having an MFR of 2.3 g/10 min. and an ethylene content of 1.0% by weight was used instead of the polypropylene, and in the surface layer, 0.3 part by weight of silica was used instead of the non-meltable crosslinked silicone resin powder.

The results of the foregoing examples and comparative examples are shown in Table 7.

TABLE 7

| | Low-speed packaging (150 packs/min.) | | | High-speed packaging (250 packs/min.) | | |
|---|---|---|---|---|---|---|
| | Film falling property | Slipperiness with respect to metal | Pack appearance | Film falling property | Slipperiness with respect to metal | Pack appearance |
| Ex. 15 | Very good | Very good | Very good | Very good | Very good | Very good |
| Ex. 16 | " | " | " | " | Good | Good |
| CEx. 11 | " | Poor | Poor | " | Very poor | Very poor |
| CEx. 12 | Poor | Very poor | Very poor | Very poor | Could not be evaluated | Could not be evaluated |

While the invention has been described in detail and with reference to specific embodiments thereof, it will be apparent to one skilled in the art that various changes and modifications can be made therein without departing from the spirit and scope thereof.

What is claimed is:

1. A propylene polymer film composed of a composition comprising 100 parts by weight of a crystalline propylene polymer and 0.01 to 3 parts by weight of a non-meltable cross-linked organosiloxane resin powder having a mean particle diameter of 0.5 to 7 $\mu$m, and having a three-dimensional structure of siloxane linkages.

2. The propylene polymer film as claimed in claim 1, wherein the crystalline propylene polymer has a melt flow rate of 0.1 to 200 g/10 min.

3. The propylene polymer film as claimed in claim 1, wherein the crystalline propylene polymer has a melt flow rate of 1 to 50 g/10 min.

4. The propylene polymer film as claimed in claim 1, wherein the crystalline propylene polymer is a propylene homopolymer, a propylene/ethylene random copolymer or a propylene/ethylene/butene random copolymer each having an ethylene content of 0 to 8% by weight and a butene content of 0 to 25% by weight.

5. The propylene polymer film as claimed in claim 1, wherein the crystalline propylene polymer is propylene/α-olefin copolymer resins having a fusion peak temperature, determined by the DSC method, of up to 145° C.

6. The propylene polymer film as claimed in claim 1, wherein the crystalline propylene polymer is at least one propylene/α-olefin copolymer resin selected from the group consisting of propylene/ethylene random copolymer resins havihg an ethylene content of 3 to 8% by weight and propylene/ethylene/butene-1 random copolymer resins having an ethylene content of 0.5 to 5% by weight and a butene-1 content of 3 to 25% by weight.

7. The propylene polymer film as claimed in any one of claims 1 to 6, wherein the crystalline propylene polymer is in the form of a powder having a true spherical degree f, defined by the equation $$f = \sqrt{A/(\pi/4)}/D_{max}$$

wherein A is the cross-sectional area (mm$^2$) of the polymer powder, and Dmax is the maximum diameter (mm) of the cross section of the polymer powder, of at least 0.8.

8. The propylene polymer film as claimed in claim 1, wherein the crystalline propylene polymer has a true spherical degree of at least 0.85.

9. The propylene polymer film as claimed in claim 1, wherein the non-meltable crosslinked silicone resin powder has a true spherical degree f, defined by the equation $$f = \sqrt{A/(\pi/4)}/D_{max}$$

wherein A is the cross-sectional area (mm$^2$) of the resin powder, and Dmax is the maximum diameter (mm) of the cross section of the resin powder, of at least 0.8.

10. The propylene polymer film as claimed in claim 1, wherein the non-meltable crosslinked silicone resin powder has a true spherical degree of at least 0.85 and a mean particle diameter of 1 to 5 microns.

11. The propylene polymer film as claimed in claim 1, wherein the amount of the non-meltable crosslinked silicone resin powder is 0.01 to 1 part by weight.

12. The propylene polymer film as claimed in claim 1, wherein the amount of the non-meltable crosslinked silicone resin powder is 0.01 to 0.5 part by weight.

13. The propylene polymer film as claimed in claim 1, wherein the amount of the non-meltable crosslinked silicone resin powder is 0.02 to 0.3 part by weight.

* * * * *